(12) United States Patent
DeAngelis

(10) Patent No.: US 9,150,261 B2
(45) Date of Patent: Oct. 6, 2015

(54) VEHICLE AIR DAM WITH OPENABLE AND CLOSABLE AIR FLOW OPENINGS

(71) Applicant: Mark E DeAngelis, West Bloomfield, MI (US)

(72) Inventor: Mark E DeAngelis, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/165,973

(22) Filed: Jan. 28, 2014

(65) Prior Publication Data

US 2015/0210325 A1    Jul. 30, 2015

(51) Int. Cl.
*B62D 37/00* (2006.01)
*B62D 35/02* (2006.01)

(52) U.S. Cl.
CPC ....................................... *B62D 35/02* (2013.01)

(58) Field of Classification Search
CPC ....... B62D 35/005; B62D 35/001; H05B 6/80
USPC ...................... 296/180.1, 180.5, 180.3, 180.4
See application file for complete search history.

(56) References Cited

U.S. PATENT DOCUMENTS

| 4,159,140 | A | | 6/1979 | Chabot et al. |
| 4,291,911 | A | * | 9/1981 | Gallmeyer ................... 296/77.1 |
| 4,951,994 | A | * | 8/1990 | Miwa ......................... 296/180.1 |
| 6,079,769 | A | | 6/2000 | Fannin et al. |
| 7,040,690 | B2 | * | 5/2006 | Soja et al. .................. 296/180.5 |
| 7,661,753 | B2 | * | 2/2010 | Shinedling et al. ........ 296/180.5 |
| 7,762,615 | B2 | * | 7/2010 | Dayton ...................... 296/180.1 |

OTHER PUBLICATIONS

Capstone Design Final Report, Deployable Front Air Deflection System; Michigan Technological University Dept. of Mechanical Engineering; Galbraith et al; Dec. 13, 2010.

* cited by examiner

*Primary Examiner* — Glenn Dayoan
*Assistant Examiner* — Sunsurraye Westbrook
(74) *Attorney, Agent, or Firm* — Ralph E. Smith

(57) ABSTRACT

An air dam for an automotive vehicle has panel wherein the panel extends vertically down from a bottom of a bumper of the vehicle when in the deployed position. The panel has at least one openable and closable air flow opening therein. In an aspect, each air flow opening opens to a mouth of a duct that extends rearwardly form the panel. In an aspect, the panel has a plurality of air flow openings and ducts. In an aspect, the air dam is a deployable air dam.

14 Claims, 2 Drawing Sheets

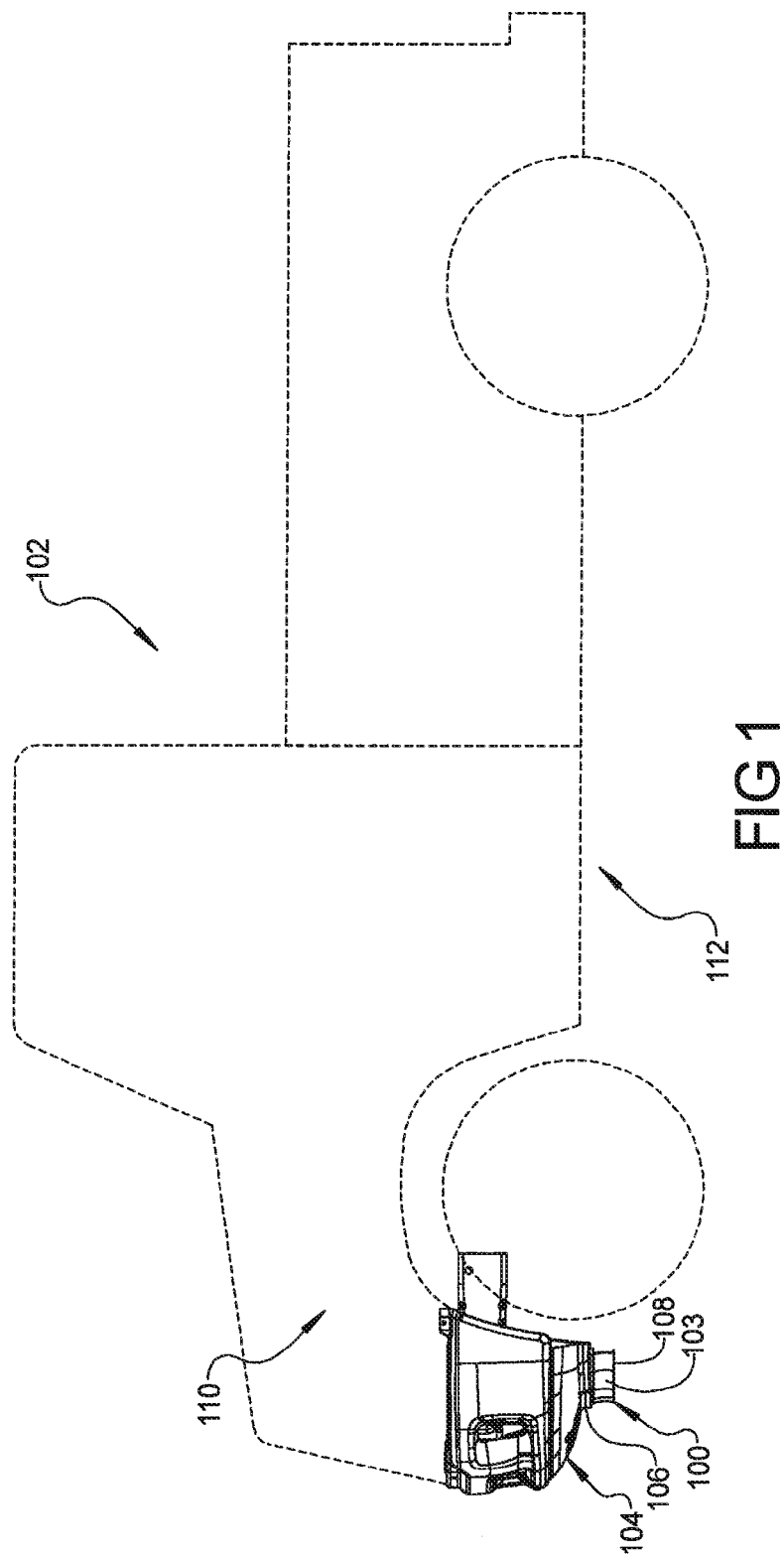

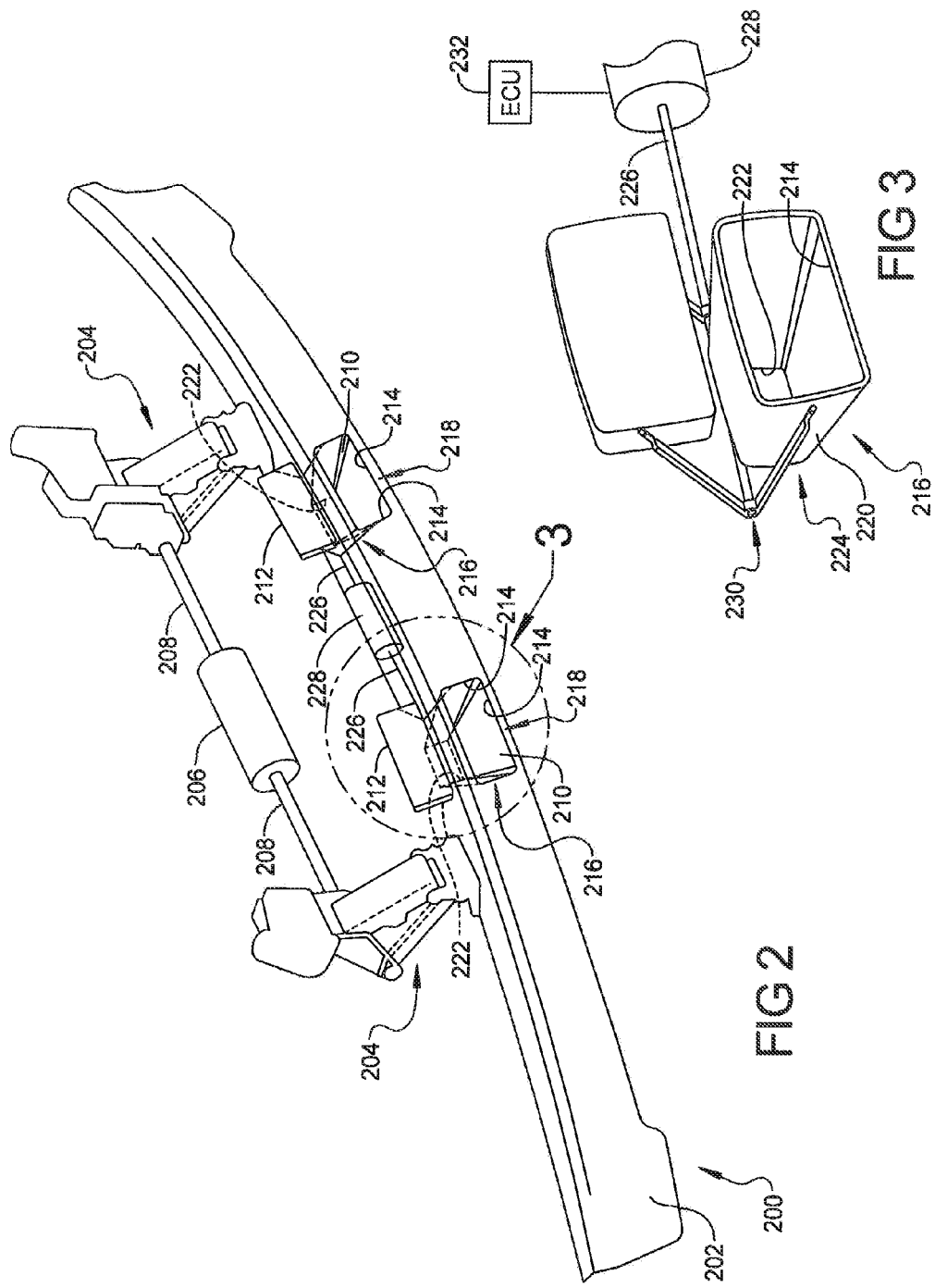

VEHICLE AIR DAM WITH OPENABLE AND CLOSABLE AIR FLOW OPENINGS

FIELD

The present invention relates to air dams for automotive vehicles.

BACKGROUND

Air dams, which are sometimes called spoilers, can be mounted to the lower front bumpers of vehicles such as pick-up trucks to reduce the amount of air passing beneath the vehicle. This reduces aerodynamic drag and helps increase fuel economy. It should be understood that the lower front bumper is in some cases surrounded by a fascia and in this type of arrangement, references to the front bumper herein are to be understood as including the front bumper/front fascia arrangement.

One type of air dam is the deployable air dam that can be moved between a deployed (or down) position where a panel of the air dam extends vertically down from a bottom of a front bumper of the vehicle to a short distance above a road surface and an undeployed (or up) position where the panel of the air dam is retracted to a position spaced from the road surface several inches more than when it is in the deployed position. For example, when the air dam is in the undeployed position, the panel of the air dam is at or slightly lower than the bottom of the front bumper of the vehicle.

One of the drawbacks of a deployable air dam when it is in the deployed position is that it blocks air to under-hood and under-body components. A fixed air dam has the same drawback of blocking air to under-hood and under-body components. This reduces the amount of heat that can be dissipated by the air flow to under-hood and under-body components.

An object of the present invention is to provide a deployable air dam that can provide increased air-flow to under-hood and/or under-body components when increased air-flow is desirable.

SUMMARY

In accordance with an aspect of the present disclosure, an air dam for an automotive vehicle includes a panel. The panel has one or more air flow openings therein that can be opened to allow air to flow through each duct and into under-body and under-hood portions of the vehicle and closed where air is blocked from flowing through the ducts.

In an aspect, the air dam includes has a door for each air flow opening movable to a closed position where it closes the air flow opening and an open position where the duct is open. In an aspect, a door actuator is coupled to each door to move it between the open and closed positions. In the aspect where each air flow opening opens to a mouth of the duct, the door closes the mouth of the duct when the door is in the closed position and opens the mouth of the duct when the door is in the open position.

In an aspect, the air dam is a deployable air dam and the panel is movable between a deployed position where the panel extends vertically down from the bottom of the bumper of the vehicle and an undeployed position where the panel is in a retracted position. The air dam also includes one or more linkages for coupling the panel to a front of the vehicle, an actuator coupled to each linkage for moving the panel of the air-dam between a deployed and an undeployed position wherein the panel extends vertically down from a bottom of a bumper of the vehicle when in the deployed position.

In an aspect, each duct is a NACA duct.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view showing a deployable air dam on a pick-up truck;

FIG. 2 is a perspective view of a deployable air dam in accordance with the aspect of the present disclosure; and FIG. 3 is an expanded perspective view of a portion a duct of the deployable air dam of FIG. 2.

DETAILED DESCRIPTION

The following description of the preferred embodiment(s) is merely exemplary in nature and is in no way intended to limit the invention, its application, or uses.

With reference to the FIG. 1 a deployable air dam 100 for an automotive vehicle such as pick-up truck 102 is shown. The air dam 100 is shown in FIG. 1 mounted to a front of the pick-up truck 102, such as to front bumper 104 of the pick-up truck 102. When in the deployed (or down) position, a panel 103 of air dam 100 extends vertically down from a bottom 106 of front bumper 104 to a short distance above a road surface such as of a road on which the pick-up truck is travelling. By way example and not of limitation, a lower edge 108 of panel 103 of air dam 100 is about six inches above the road surface when the air dam is deployed. When deployed, air dam 100 thus reduces the ground clearance at the front of the pick-up truck from about eight inches (the gap between the bottom of the bumper and the road surface) to about six inches. In an aspect, panel 103 is illustratively a plastic panel and in an aspect, a 2.5-3.0 mm thick panel of nylon and Santoprene. It should be understood that panel 103 can be made of other types of plastics, and can also be made of other materials such as metals. In an aspect, panel 103 is shaped to follow the contour of bumper 104. The deployable air dam 100 in an example is the deployable air dam that is shown and described in U.S. Ser. No. 14/034,041 filed Sep. 23, 2013, the entire disclosure of which is incorporated herein by reference.

With reference to FIG. 2, a deployable air dam 200 in accordance with an aspect of the present disclosure is shown, which illustratively is used in lieu of deployable air dam 100. Deployable air dam 200 has panel 202 that extends along bumper 104 of vehicle 102 and has a width that is approximately the same or slightly less than the width of bumper 104. In an aspect, panel 202 is similar to panel 103 but with the addition of one or more ducts as described below. One or more linkages 204 are attached to panel 202 and to bumper 104. In this regard, while two linkages 204 are shown in FIG. 2, is should be understood that in an aspect, one linkage 204 is used and in other aspects, more than two linkages 204 are used. An actuator rod 208 is attached to each linkage 204 and to an actuator 206, which is illustratively an electric actuator. It should be understood that actuator 206 can be any type of actuator that can rotate actuator rod 208. It should be understood that while one actuator rod 208 and actuator 206 are shown in FIG. 2, more than one actuator rod 208 and/or actuator 206 can be used.

Panel 202 has one or more openings 210 therein and a door 212 for each opening that is movable to a closed position where it closes and blocks the opening thus blocking air flow through the opening and to an open position where air can flow through the opening. In the illustrative embodiment shown in FIGS. 2 and 3, each opening 210 opens to a mouth 214 of a duct 216, with mouth 214 being at a front end 218 of duct 216. Each duct 214 has a respective door 212 that when moved to the closed position blocks mouth 214 of duct 216 to close duct 216. Each duct 216 has a hollow body 220 (FIG. 3) that extends rearward from panel 202 with an exit opening 222 at a back 224 of body 220. An actuator rod 226 (referred to herein as door actuator rod 226) is coupled to each door 212 and to an actuator 228 (referred to herein as door actuator 228), which is illustratively an electric actuator. It should be understood that duct door actuator 228 can be any type of actuator that can rotate door actuator rod 226. Illustratively as best shown in FIG. 3, each door 212 is mounted to a respective duct 216 by a door linkage 230 to which the door actuator rod 226 is coupled.

In an aspect, any duct 216 can extend into under-hood portion 110 (FIG. 1) of pick-up truck 102 or into under-body portion 112 (FIG. 1) of pick-up truck 102 with exit opening 222 of that duct 216 adjacent a component (or components) of pick-up truck 102 where in some cases additional air flow for thermal management, such as cooling, is desirable.

In an aspect, one or more ducts 216 are NACA ducts.

When air dam 200 is in the deployed position, doors 212 can be opened to provide air flow through panel 202 to the under-hood and under-body portions 110, 112 of the pick-up truck 102 and closed when air flow is not needed. In this regard, when doors 212 are closed, air dam 200 provides less aerodynamic drag than when doors 212 are open. Doors 212 for example are opened when additional air flow is needed to cool heat sensitive components in the under-hood and/or under-body portions 110, 112 of pick-up truck 102. In this regard, in an aspect duct door actuator 228 is coupled to an electronic control unit (ECU) 232 that is configured to control duct door actuator 228 to open doors 212 when more air flow is needed to the under-hood and/or under-body portions 110, 112 of pick-up truck 102 and to close doors 212 when such additional air flow is not needed. In an aspect, ECU 232 is an engine controller or body controller of pick-up truck 102.

In another embodiment, the air dam is a fixed air dam which for example includes a panel (such as panel 202), openings (such as openings 210), doors (such as doors 212), ducts (such as ducts 214), a door actuator rod (such as door actuator rod 226) and a door actuator (such as door actuator 228). As a fixed air dam, panel 202 extends vertically down from the bottom 106 of front bumper 104 and is fixed in that position and the air dam does not include linkages 204, actuator rod 208 and actuator 206.

It should be understood that ECU 232 is, is part of, or includes an Application Specific Integrated Circuit (ASIC); an electronic circuit; a combinational logic circuit; a field programmable gate array (FPGA); a processor (shared, dedicated, or group) that executes code; a programmable logic controller, programmable control system such as a processor based control system including a computer based control system, a process controller such as a PID controller, or other suitable hardware components that provide the described functionality or provide the above functionality when programmed with software as described herein; or a combination of some or all of the above, such as in a system-on-chip.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air dam for an automotive vehicle, comprising a panel extending vertically downwardly from a bottom of a bumper of the vehicle, the panel having at least one openable and closable air flow opening therein wherein when the air flow opening is open air can flow through it and when the air flow opening is closed air is blocked from flowing through it.

2. The air dam of claim 1, including a door for each air flow opening in the panel, the door movable to a closed position where it blocks air flow through the opening and to an open position where air can flow through the air flow opening.

3. The air dam of claim 2 wherein each air flow opening opens to a mouth of a duct that extends rearward from the panel, the door for each air flow opening closing the mouth of the duct when the door is moved to its closed position and opening the mouth of the duct when the door is moved to its open position.

4. The air dam of claim 3 wherein the panel has a plurality of the air flow openings and ducts.

5. The air dam of claim 4 including a duct door actuator coupled to the doors for moving the doors to their open and closed positions.

6. The air dam of claim 1 wherein the panel has a plurality of air flow openings.

7. The air dam of claim 6 including a duct door actuator coupled to the doors for moving the doors to their open and closed positions.

8. The air dam of claim 1 wherein the air dam is a deployable air dam and the panel is movable between a deployed position where the panel extends vertically down from the bottom of the bumper of the vehicle and an undeployed position where the panel is in a retracted position, the air dam further including at least one linkage coupling the panel to beneath a front of the vehicle and an actuator coupled to each linkage for moving the panel of the air-dam between the deployed and an undeployed positions.

9. The air dam of claim 8, including a door for each air flow opening in the panel, the door movable to a closed position where it blocks air flow through the opening and to an open position where air can flow through the air flow opening.

10. The air dam of claim 9 wherein each air flow opening opens to a mouth of a duct that extends rearward from the panel, the door for each air flow opening closing the mouth of the duct when the door is moved to its closed position and opening the mouth of the duct when the door is moved to its open position.

11. The air dam of claim 10 wherein the panel has a plurality of the air flow openings and ducts.

12. The air dam of claim 11 including a duct door actuator coupled to the doors for moving the doors to their open and closed positions.

13. The air dam of claim 8 wherein the panel has a plurality of air flow openings.

14. The air dam of claim 13 including a duct door actuator coupled to the doors for moving the doors to their open and closed positions.

* * * * *